Nov. 8, 1955     W. M. NELSON     2,722,793
AUTOMATIC DRAG CLEANER
Filed Oct. 24, 1951     2 Sheets-Sheet 1

Wallace M. Nelson
INVENTOR.

Nov. 8, 1955   W. M. NELSON   2,722,793
AUTOMATIC DRAG CLEANER
Filed Oct. 24, 1951   2 Sheets-Sheet 2
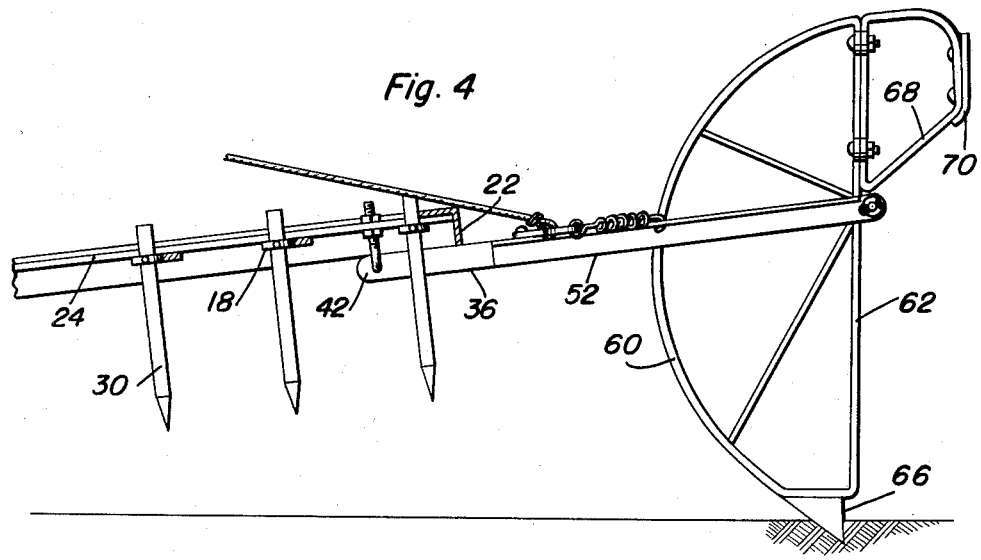
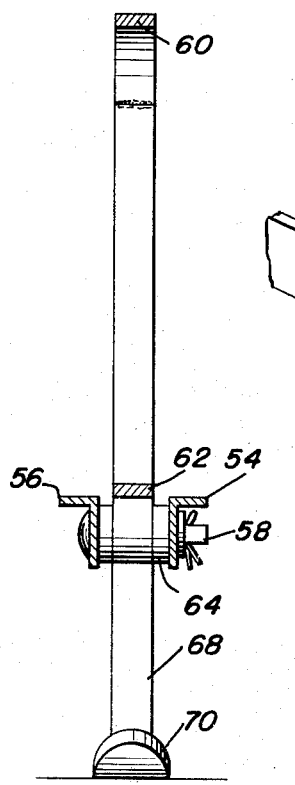
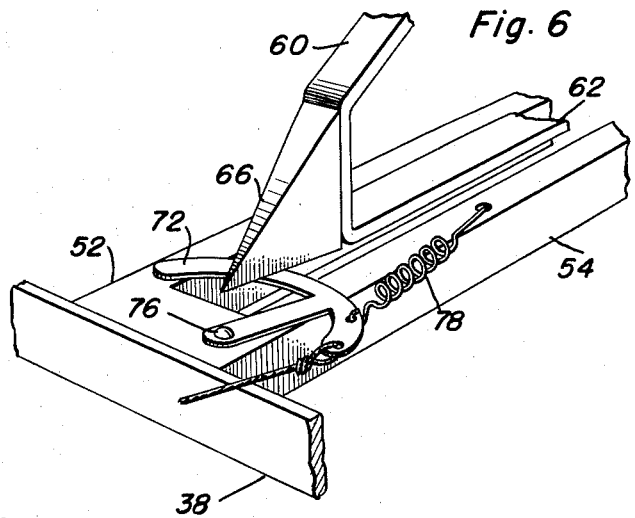
Wallace M. Nelson
INVENTOR.

United States Patent Office 2,722,793
Patented Nov. 8, 1955

2,722,793
AUTOMATIC DRAG CLEANER
Wallace M. Nelson, Thief River Falls, Minn.
Application October 24, 1951, Serial No. 252,917
1 Claim. (Cl. 55—34)

This invention relates to an automatic drag cleaner and particularly to a device for dumping the trash and other accumulations from a spike tooth harrow.

In the operation of drag harrows particularly of the spike tooth variety any trash or other material loose on the field is apt to be caught in the harrow and render the same substantially ineffective as the trash prevents the penetration of the harrow teeth into the soil. It has heretofore been customary for an operator to walk behind the harrow and occasionally take a hold of the rear cross bar of the same and lift up the harrow to permit escape of accumulated trash from under the harrow. When a tractor is being used to drag a harrow it is customary for a single person to drive the tractor and to supervise the construction and operation of the harrows behind the tractor. It is extremely inconvenient for the operator to get down from the tractor and operate the harrows and remove trash from under the same.

The present invention provides a means for automatically lifting the harrow under the control of the operator so that the trash may be dumped from under the harrow. This is accomplished by means of a half wheel device which is pivotally connected to the frame of the harrow so that when the wheel turns it will lift up the harrow in substantially the same manner as would happen if the operator had grasped the rear bar of the harrow and lifted it up. The half wheel device is mounted off-center so that the forward end of the device is somewhat heavier than the rear end and will tend to tip into the earth. Preferably the earth engaging portion is provided with a nose which assists in digging into the ground. Likewise, the short or rear end of the device is preferably provided with a runner or other means for elevating that portion above the ground to assist the nose or tip in digging into the ground.

It is accordingly an object of this invention to provide an improved cleaning device for harrows.

A further object of this invention is to provide a cleaner which can be controlled by an operator riding on a tractor.

It is a further object of this invention to provide a cleaner which can be operated at the will of the operator.

It is a further object of this invention to provide a cleaner which is pivotally attached to the frame of a harrow.

A further object of this invention is to provide a cleaner having an automatic flange for retaining cleaner in inoperative position.

Other objects and many of the attendant advantages of this invention will be apparent from the following detailed description taken in conjunction with the accompanying drawings, in which:

Figure 4 is a similar view showing the cleaner in cleaning position;

Figure 5 is a section taken substantially on the plane indicated by the line 5—5 of Figure 2 and showing the mounting of the cleaner; and Figure 6 is an enlarged fragmentary view of the trip mechanism of the cleaner.

Figure 1:
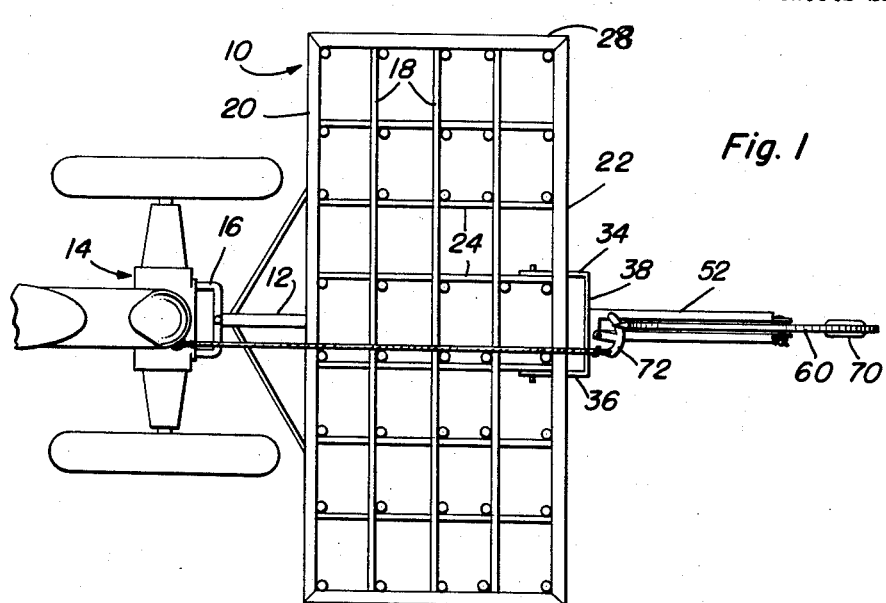
Figure 1 is a top plan view of a harrow with the cleaner attachment in place.
Figure 2:
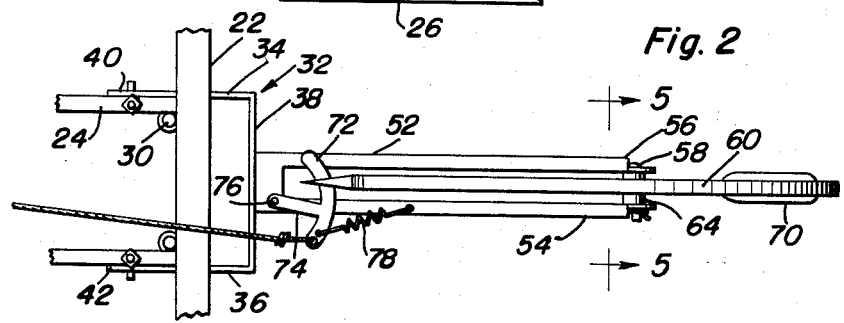
Figure 2 is an enlarged top plan view of the cleaner mechanism.
Figure 3:
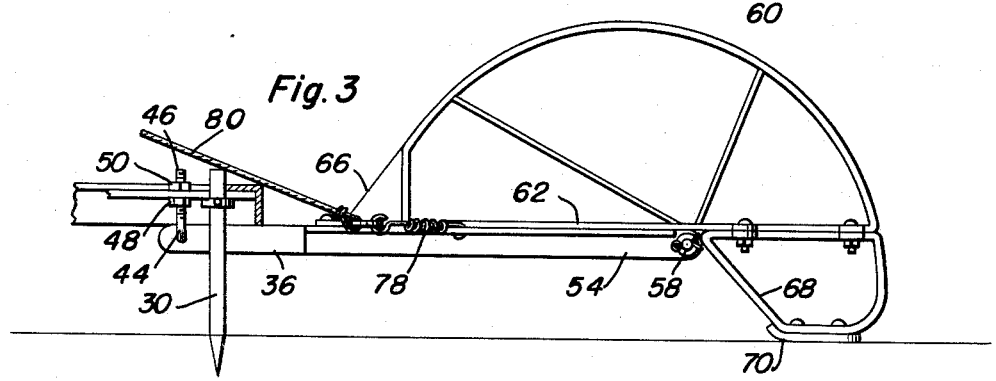
Figure 3 is a side elevation showing the cleaner in inoperative position.

In the exemplary embodiment of the invention a drag harrow 10 is mounted by means of a suitable drag or drawbar 12 behind the tractor 14 having a hitch bar 16. While for simplicity of illustration a single section of harrow has been illustrated it is, of course, to be understood that a plurality of sections are usually utilized and each of the sections will be provided with the cleaner presently to be described.

The harrow 10 is constructed of a plurality of intermediate cross bars 18 and front and back bars 20 and 22 which are substantially heavier than the intermediate cross bars 18. Likewise there are a plurality of transverse bars 24 with the end bars 26 and 28 which are of substantially the same weight as the front and back cross bars whereof the section is outlined with bars of heavier cross section on the intermediate bars. Mounted on the intermediate bars usually at the junction thereof are suitable harrow elements herein illustrated as spikes 30.

The cleaner device comprises a U-frame 32 having arms 34 and 36 joined by a web 38 with the forward ends 40 and 42 of the arms 34 and 36 joined to some intermediate portion of the harrow such as the transverse bars 22 or the cross bars 18 by means of suitable pivotal or other devices such as eye-bolts 44. The ends 46 of the eye-bolts 44 are threaded and suitable lock nuts 48 and 50 are utilized to engage suitable openings in the intermediate portion of the harrow.

A bifurcated member having arms 54 and 56 is rigidly connected to the web 38 of the U-frame and extends rearwardly therefrom. The rearward ends of the members 54 and 56 are provided with openings in which is mounted a journal pin 58.

Actuating member for the lifter comprises a half wheel or half circle device or member having a cross member 62 connected across the ends of the half round member 60. The bearing sleeve 64 is rigidly connected to the cross member 62 at a point off-center from the center of the half wheel and preferably materially closer to the rear section of the half wheel than to the front section. The offset or mounting of the sleeve 64 causes the front end of the half wheel to be heavier than the back half so that it has a tendency for the tip 66 to contact and dig into the earth. Also, the off-center arrangement provides sufficient lifting distance to lift the harrow over the trash without an excessive size to the lifting portions. The tendency of the tip 66 to be directed into the ground is augmented by means of a support in the form of a runner 68 secured to the short end of the cross member 62. Preferably the runner 68 has a replaceable shoe 70 or so-called wear-plate so that it can be replaced without injury to the runner 68 by contact with the earth, stones or other impediments.

In order to prevent the lifting mechanism from continuously stopping the harrow, a latch bar 72 is mounted on an arm 74 which is pivoted on a rivet 76 attached to the member 52. A spring 78 is connected to the latch 72 and to the arm 54 for continually urging the latch member across the bifurcated portion of the arm 72 so that the tip 66 will strike the latch member and be inhibited from turning operation. With the latch bar 72 in place the tip will contact the bar 72 so that the member 52 will be substantially horizontal with the weight of the dumping attachment supported on the eye-bolts 44 and the runner 68. In order to provide the dumping under the control of the operator, a pull cord 80 is connected to the end of the latch 72 so that it may be oscillated about the pivot bolt 76 to withdraw the latch member from under the tip 66 and allow the tip 66 to come into contact with the earth.

In the operation of the drag cleaning attachment the latch 72 will normally be in place across the bifurcated arms 52 and 54 so that the tip 66 is inhibited from passing through between the arms 52 and 54. The structure is then supported on the eye-bolts 44 and the runner 68 and is substantially free from the rear bar 22 of the harrow. When it is desired to dump the harrow the operator pulls the rope 80 disengaging the latch 72 allowing the tip 66 to come in contact with the earth and because of the tilted action of the off-center mounting and the support of the runner 68 the tip will engage the ground and cause the half wheel to rotate about the off-center sleeve 64. Elevation of the bifurcated member 52 will bring the U-shaped frame 32 into contact with the bottom of the bar 22 and lift the entire harrow as would be done if the operator had grasped the bar and lifted the same. As soon as the tip 66 has dropped past the latch 72, the latch 72 may be released and the spring 78 will urge it back into intercepting position so that as soon as the harrow has been dumped the elevating mechanism will be returned to inoperative position.

While for purposes of illustration a preferred embodiment of the invention has been shown and described according to the best present understanding thereof, it will be apparent to those skilled in the art that changes and modifications can be made therein, without departing from the true spirit of the invention.

Having described the invention, what is claimed as new is:

A drag rake cleaner comprising a U-shaped frame having the ends of the U attached to an intermediate cross bar of a harrow, said frame extending under the rear cross bar of the harrow, a bifurcated member rigidly attached to and extending substantially in the plane of the U-shaped frame, a cross pin journaled at the end of said bifurcated member, a substantially half circular member, a cross member joining the ends of said half circular member, a bearing sleeve attached to said cross member at a point removed from the center thereof, said sleeve being journaled on said cross pin, an earth engaging tip on the half circular member at the long end of said cross member, a latch member pivotally mounted on said bifurcated member, resilient means urging said latch member into position to intercept the earth engaging tip on said half circular member, means for oscillating said latch to release said tip, a runner attached to the short end of said cross member.

References Cited in the file of this patent

UNITED STATES PATENTS

| 1,198,846 | Huncker | Sept. 19, 1916 |
| 1,475,376 | Firkin | Nov. 27, 1923 |
| 1,953,208 | Atkinson | Apr. 3, 1934 |
| 2,502,835 | Dunsdon | Apr. 4, 1950 |

OTHER REFERENCES

Farm Implement and Machinery Review, vol. 71, No. 847, page 567 (November 1, 1945).